United States Patent [19]

Miyakawa

[11] Patent Number: 4,911,959
[45] Date of Patent: Mar. 27, 1990

[54] ORNAMENTAL BAND FOR VEHICLE OR THE LIKE AND METHOD FOR MAKING SAME

[76] Inventor: Naohisa Miyakawa, c/o Tokiwa Chemical Industries Co., Ltd. of 261 - 5 Kawarashi, Shirai-cho, Inba-gun, Chiba-ken, Japan

[21] Appl. No.: 240,616
[22] Filed: Sep. 6, 1988
[51] Int. Cl.⁴ .............................................. B60R 13/04
[52] U.S. Cl. ...................................... 428/31; 52/716; 293/128; 428/40
[58] Field of Search .................... 428/31, 40; 52/716; 293/128

[56] References Cited

U.S. PATENT DOCUMENTS

| | | | |
|---|---|---|---|
| 4,349,592 | 9/1982 | Nussbaum | 428/31 |
| 4,446,179 | 5/1984 | Waugh | 428/31 |
| 4,678,690 | 7/1987 | Palmer et al. | 428/31 |
| 4,708,894 | 11/1987 | Mabuchi et al. | 428/31 |
| 4,778,550 | 10/1988 | Barton et al. | 428/31 X |

FOREIGN PATENT DOCUMENTS 59-150657 10/1984 Japan ...................................... 428/31

*Primary Examiner*—Henry F. Epstein
*Attorney, Agent, or Firm*—Wenderoth, Lind & Ponack

[57] ABSTRACT

An ornamental band for vehicles or the like having an elongate laminar structure including an outer colorless transparent synthetic resin layer having recesses in the inner surface, an inner colored synthetic resin layer having ridges on the outer surface for engaging in the recesses and at least one ornament strip interposed between the inner and outer resin layers and having a color different from that of the inner layer. One colorless-transparent and two different color resins are extrusion molded into an elongate cross-section laminar structure including the outer colorless-transparent resin layer with the recesses and the inner colored resin layer with mating ridges for engaging in the recesses and the ornament strip interposed between the inner and outer layers. The longitudinal opposite end portions of the laminar structure are bent by 90° to form opposing bent portions and the bent portions are cut off the central portion of the laminar structure along the plane of the inner surface of the laminar structure.

4 Claims, 3 Drawing Sheets

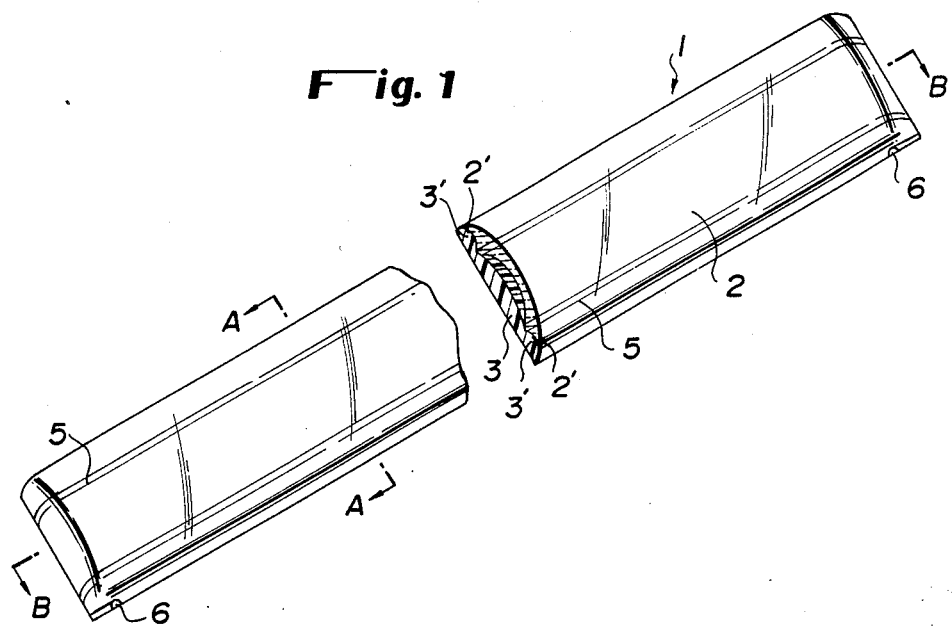
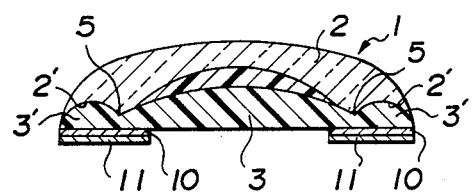

ORNAMENTAL BAND FOR VEHICLE OR THE LIKE AND METHOD FOR MAKING SAME

BACKGROUND OF THE INVENTION

This invention relates to an ornamental band to be secured to a selected area of the surface of a vehicle or furniture to enhance the ornamental effect of the vehicle or furniture and maintain the ornamental effect for a long time and has its object to provide an ornamental band having finely finished longitudinal opposite ends for enhancing the ornamental appearance of vehicles or the like.

There have been proposed and practically employed a variety of ornamental bands for vehicles to enhance the ornamental appearance of the vehicles. The prior art ornamental bands have been generally produced by extrusion-molding synthetic resin or resins having a brilliant tape core incorporated therein. However, since the thus extruded prior art ornamental band has an indefinite length, the band has to be cut at the opposite ends to a desired length leaving the ends as cut and thus, the end cuts present quite an unsightly appearance.

Therefore, in use, the opposite end cuts of the molded ornamental band are usually covered by end covers having substantially the same cross-sectional shape and size as those of the ornamental band itself by gluing or fitting the covers to or on the end cuts to give a pleasing appearance to the band ends. In this case, since the end cover to be glued to or fitted on the associated longitudinal end of the band is produced by molding synthetic resin, the end cover fulfills its intended function as the cover provided that the end cover has substantially the same cross-sectional shape and size as the ornamental band itself, but the end cover has the drawbacks that the end cover protrudes outwardly from the associated longitudinal end of the ornamental band resulting in aesthetically poor appearance and that the end cover tends to easily get damaged and/or separated from the end of the band at the connection portion of the end cover to the band end.

Further, there has been also known an extrusion molded ornamental band having end covers integrally molded with the longitudinal opposite ends of the band. The ornamental band having the end covers molded integrally with the longitudinal opposite ends thereof can solve the problems inherent to the prior art ornamental band having the separately molded and attached end covers, that is, the troublesome and time-consuming operation of making the separate end covers and the unsightly finish. Howeer, the mold unit of the extrusion-molding machine for ornamental bands having end covers molded integrally with the longitudinal opposite ends thereof is very expensive and the ornamental band having the end covers integrally formed with the longitudinal opposite ends is still not perfectly satisfactory because the band does not enhance the ornamental effect to be imparted to the vehicle to which the ornamental band is applied.

SUMMARY OF THE INVENTION

Therefore, the present invention has its object to provide a novel and improved ornamental back for vehicles which can effectively eliminate the drawbacks inherent in the prior art ornamental bands referred to hereinabove. Another object of the present invention is to provide a method for making such an ornamental band. In order to attain the objects, according to the present invention, the ornamental band is produced by extrusion-molding synthetic resins into an elongate laminar structure of indefinite length, bending the laminar structure at areas spaced from the longitudinal opposite ends thereof by a desired distance to form bent portions and cutting the bent portions off at the bases of the bent portions along the plane of the inner surface of the laminar structure.

According to one aspect of the present invention, there is provided an ornamental band for vehicles which comprises an elongate laminar structure of arcuate cross-section including a colorless-transparent synthetic resin layer having an arcuate cross-section and including arcuate cross-section recesses at the opposite side edges of the inner surface of the layer; an inner colored synthetic resin layer having an arcuate cross-section and including arcuate cross-section ridges at the opposite side edges of the outer surface of the inner layer for engaging in said arcuate cross-section recesses; and at least one arcuate cross-section colored ornament strip interposed between said outer and inner layers and having a color different from that of said inner layer, said ornament strip including metal particles incorporated therein; transverse planar cuts formed at the longitudinal opposite ends of said laminar structure and extending along the plane of the inner surface of said laminar structure; an adhesive layer applied to each planar cut; and a release paper piece applied to the exposed surface of each adhesive layer.

According to another aspect of the present invention, there is provided a method for producing an ornamental band for vehicles which comprises the steps of extrusion-molding a colorless-transparent synthetic resin, a colored synthetic resin and a synthetic resin having a color different from that of said first-mentioned colored synthetic resin and including metal particles incorporated therein to form a laminar structure of arcuate cross-section including an arcuate cross-section colorless-transparent outer layer, an arcuate cross-section colored inner layer formed of said first mentioned colored synthetic resin and at least one arcuate cross-section colored ornament strip interposed between said outer and inner layers and formed of said second-mentioned synthetic resin having the metal particles incorporated, said outer layer including arcuate cross-section recesses at the opposite side edges of the inner surface of the outer layer and said inner layer including arcuate cross-section ridges at the opposite side edge of the outer surface of the inner layer for engaging in said arcuate cross-section recesses; undercutting said inner layer at areas spaced from the opposite ends of the layer; folding said laminar structure at said undercuts by 90° to form end portions oriented at right angles to the central portion of the laminar structure; cutting said end portions at their bases off said central portion of the laminar structure to form transverse planar cuts at the longitudinal opposite ends of said laminar structure extending in the plane of the inner surface of the laminar structure; applying an adhesive layer to each transverse planar cut; and applying a release paper piece to the exposed surface of said adhesive layer.

The above and other objects and attendant advantages of the present invention will be more readily apparent to those skilled in the art from a reading of the following detailed description in conjunction with the accompanying drawings which show one preferred embodiment of the present invention for illustration purposes only, but not for limiting the cope of the same in any way.

BRIEF DESCRIPTION OF THE DRAWINGS

FIG. 1 is a perspective view of the preferred embodiment of the ornamental band for vehicles and the like according to the present invention with a portion thereof cut away;

FIG. 2 is a cross-sectional view taken along substantially the line A—A of FIG. 1;

PREFERRED EMBODIMENT OF THE INVENTION

Figure 3:
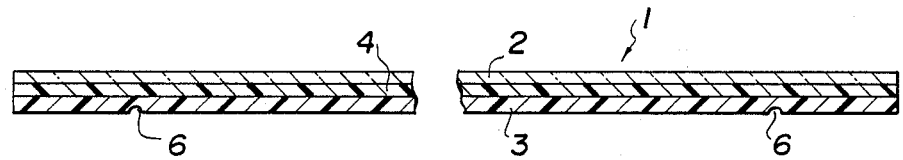
FIG. 3 is a longitudinal sectional view of said ornamental band taken along substantially the line B—B of FIG. 1.

The present invention will be now described referring to the accompanying drawings and more particularly, FIGS. 1 and 2 in which the preferred embodiment of the ornamental band of the invention is illustrated. The preferred embodiment of the ornamental band is generally shown by reference numeral 1. The ornamental band is in the form of an elongate synthetic resin laminar structure and has an arcuate cross-section. The ornamental band 1 comprises an outer layer 2 formed of colorless-transparent synthetic resin and having an arcuate cross-section and an inner layer 3 formed of a colored-synthetic resin sold under the trade name "Aionomer", for example, or the like and having an arcuate cross-section co-extending with the outer layer 2. A pair of arcuate cross-section recesses 2', 2' are formed at the opposite side edges of the inner surface of the outer layer 2 and similarly, a pair of complementary shaped ridges 3', 3' are formed at the opposite side edges of the outer surface of the inner layer 3. The recesses 2' and ridges 3' extend in the longitudinal direction of the layers 2 and 3, respectively so that the two layers can be positively held in the nesting position. Second longitudinally extending recesses 5 are provided in the inner layer 3 between the ridges 3' and the longitudinal control part of layer 3. Interposed between the outer and inner layers 2 and 3 and extending in the longitudinal direction of the layers is at least one colored ornament strip 4 of arcuate cross-section having metal particles incorporated therein. The ornament strip 4 is formed of a synthetic resin or polyester film having a color different from that of the inner layer 3. According to the present invention, the colored ornament strip 4 may be also formed of a colored foam synthetic resin. In such a case, the colored ornament strip 4 can be seen as an embossed beautiful ornament through the transparent outer layer 2.

Further, the inner surface of the inner layer 3 is undercut at 6, 6 inwardly spaced from the longitudinal opposite extreme ends of the inner layer by a selected distance as shown in FIG. 3.

Figure 4:
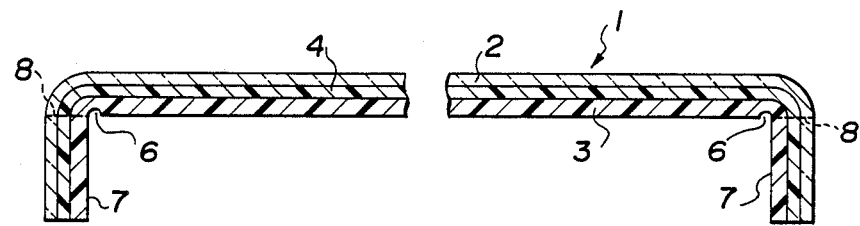
FIG. 4 is a longitudinal sectional view of said ornamental band with the longitudinal opposite end portions thereof bent at right angles to the central portion thereof.
Figure 5:
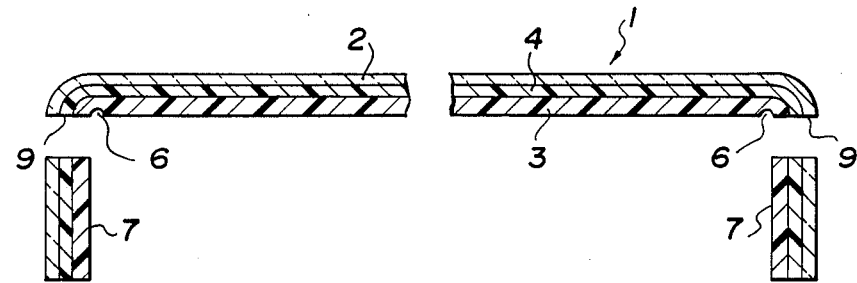
FIG. 5 is a view similar to FIG. 4, but shows the band with the longitudinal opposite end portions cut off the central portion thereof.

Now, the method for producing the above-mentioned preferred embodiment of the ornamental band according to the present invention will be described referring to FIGS. 3 to 5 inclusive. First of all, the above-mentioned three different types of synthetic resins are extrusion-molded into an elongate laminar structure of indefinite length having an arcuate cross-section as shown in FIG. 3. The thus molded laminar structure comprises the arcuate cross-section colorless-transparent outer layer 2 having the arcuate cross-section recesses 2' at the opposite side edges of the inner surface thereof, the arcute cross-section colored inner layer 3 having the mating arcuate cross-section ridges 3' at the opposite side edges of the outer surface for engaging in the recesses 2' and the undercuts 6 at areas inwardly spaced from the longitudinal opposite ends of the inner surface of the inner layer by a selected distance and the arcuate cross-section ornament strip 4 interposed between the outer and the inner layers 2, 3.

The laminar structure is then bent by 90° at the undercuts 6 under heating to form bent portions 7, 7 which are oriented right angles to the central portion of the structure. Thereafter, the bent portions 7 are cut off from the central portion of the structure along the plane 8 of the inner surface of the laminar structure to form transverse planar cuts 9, 9 on the inner surface of the laminar structure. In FIG. 2, reference numeral 10 denotes an adhesive layer applied to each of the cuts 9 and having a release paper piece 11 on the outer surface thereof.

Figure 6:
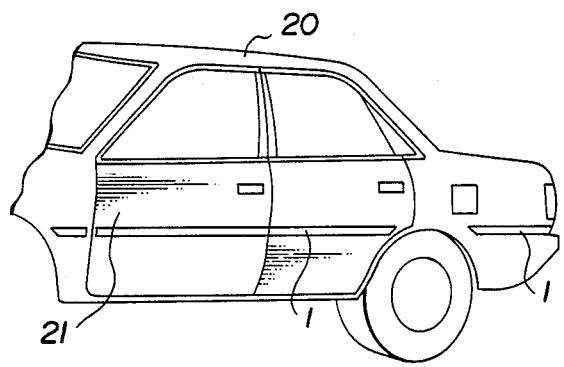
FIG. 6 is a fragmentary perspective view of a vehicle to which the ornamental band of the invention is secured.

With the above-mentioned construction and arrangement of the components of the ornamental band 1 according to the present invention, in use, as shown in FIG. 6, the release paper pieces 11 are removed from the adhesive layers 10 to expose the adhesive layers 10 and the ornamental band 1 is applied to a door 21 or a selected area of the body of a vehicle 20 by means of the adhesive layers. In addition to the vehicle, the ornamental band 1 can be also used at a selected area on furniture or a building.

Thus, according to the present invention, the longitudinal opposite ends of the ornamental band are finely finished by eliminating the poor appearance as a result of finishing by attaching separate end covers to the longitudinal opposite ends of the ornamental band as in the prior art and according to the present invention, the finishing can be easily performed resulting in reduction in production cost. And since the opposite end portions of the laminar structure are bent by 90° to form the portions to be cut off and the bent portions are separated from the rest of the laminar structure by cutting the portions along the plane of the inner surface of the laminar structure, the bending and cutting of the structure can be quite easily performed. Furhermore, the cuts at the longitudinal ends of the completed band can be positively secured to any selected area on the vehicular body.

Still furthermore, according to the present invention, since the colorless transparent synthetic resin outer layer 2 is disposed on the outer surface of the ornament strip, the ornament lines of different colors can be seen through the colorless transparent outer layer to thereby obtain an ornamental band which has an excellent ornament effect.

While only one embodiment of the invention has been shown and described in detail, it will be understood that the same is for illustration purpose only and not be be taken as a definition of the invention, reference being had for the purpose to the appended claims.

What is claimed is:

1. An ornamental band for vehicles comprising an elongate laminar structure of arcuate cross-section and having an inner surface and which includes a colorless-transparent synthetic resin layer having an arcuate cross-section and including arcuate cross-section recesses at the opposite side edges of the inner surface of the layer; an inner colored synthetic resin layer having an arcuate cross-section and including arcuate cross-section ridges at the opposite side edges of the outer surface of the inner layer engaging in said arcuate cross-section recesses; and at least one arcuate cross-section colored ornament strip interposed between said outer and inner layers and having a color different from that of said inner layer, said ornament strip including metal particles incorporated therein; the longitudinal opposite ends of said layers being bent through 90° and having transverse planar cuts coplanar with the plane of the inner surface of said laminar structure; an adhesive layer applied to each planar cut; and a release paper piece applied to the exposed surface of each adhesive layer.

2. The ornamental band as set forth in claim 1 wherein said arcuate cross-section recesses extend in the longitudinal direction of said outer layer of said arcuate cross-section ridges extend in the longitudinal direction of said inner layer.

3. The ornamental band for vehicles as set forth in claims 1 or 2, further including second longitudinally extending recesses defined between the central portion and said ridges of the inner layer.

4. The ornamental band as set forth in claim 1, wherein said inner surface has transverse undercuts thereacross at the longitudinal ends thereof with said layers being bent with said undercuts as the center of bending.

* * * * *